United States Patent [19]

Radke

[11] 4,101,015

[45] Jul. 18, 1978

[54] VIBRATION DAMPER WITH VARIABLE SPRING RATE AND DAMPING FRICTION

[75] Inventor: Edmund John Radke, Mount Clemens, Mich.

[73] Assignee: Borg-Warner Corporation, Chicago, Ill.

[21] Appl. No.: 755,530

[22] Filed: Dec. 29, 1976

[51] Int. Cl.² .................. F16D 3/14; F16D 47/02; F16D 69/00

[52] U.S. Cl. .................. 192/106.2; 64/27 C; 64/27 F

[58] Field of Search .......... 192/106.1, 106.2; 64/27 C, 27 F

[56] References Cited

U.S. PATENT DOCUMENTS

| 2,028,951 | 1/1936 | Reed | 192/106.2 |
|---|---|---|---|
| 2,276,416 | 3/1942 | Nutt | 192/106.2 |
| 3,266,271 | 8/1966 | Stromberg | 192/106.2 |
| 3,327,820 | 6/1967 | Maurice | 192/106.2 |
| 3,362,194 | 1/1968 | Bertelson et al. | 192/106.2 |
| 3,578,121 | 5/1971 | Maurice | 192/106.2 |
| 3,811,545 | 5/1974 | Sato et al. | 192/106.1 |
| 3,863,747 | 2/1975 | Werner et al. | 192/106.2 |
| 3,931,876 | 1/1976 | Beeskow et al. | 192/106.2 |
| 3,948,373 | 4/1976 | Wörner | 192/106.2 |
| 3,995,726 | 12/1976 | DeGennes | 192/106.2 |

FOREIGN PATENT DOCUMENTS

| 14,761 | 1971 | Japan | 192/106.2 |
|---|---|---|---|
| 14,604 | 1970 | Japan | 192/106.2 |
| 27,486 | 1970 | Japan | 192/106.2 |
| 1,235,699 | 6/1971 | United Kingdom | 192/106.2 |

*Primary Examiner*—Ronald C. Capossela
*Attorney, Agent, or Firm*—James A. Geppert

[57] ABSTRACT

A torsional vibration dampener assembly having resilient means to provide a variable torque output in conjunction with variable damping friction torque. The assembly utilizes a first set of torsion springs to provide a low deflection or displacement rate for a first stage of travel between the input and output members and a second set of springs providing an increased deflection rate for a second stage of travel, and a cooperating cam construction which can be arranged to provide an increase or decrease in damping friction as required in relation to the transmitted torque.

11 Claims, 21 Drawing Figures

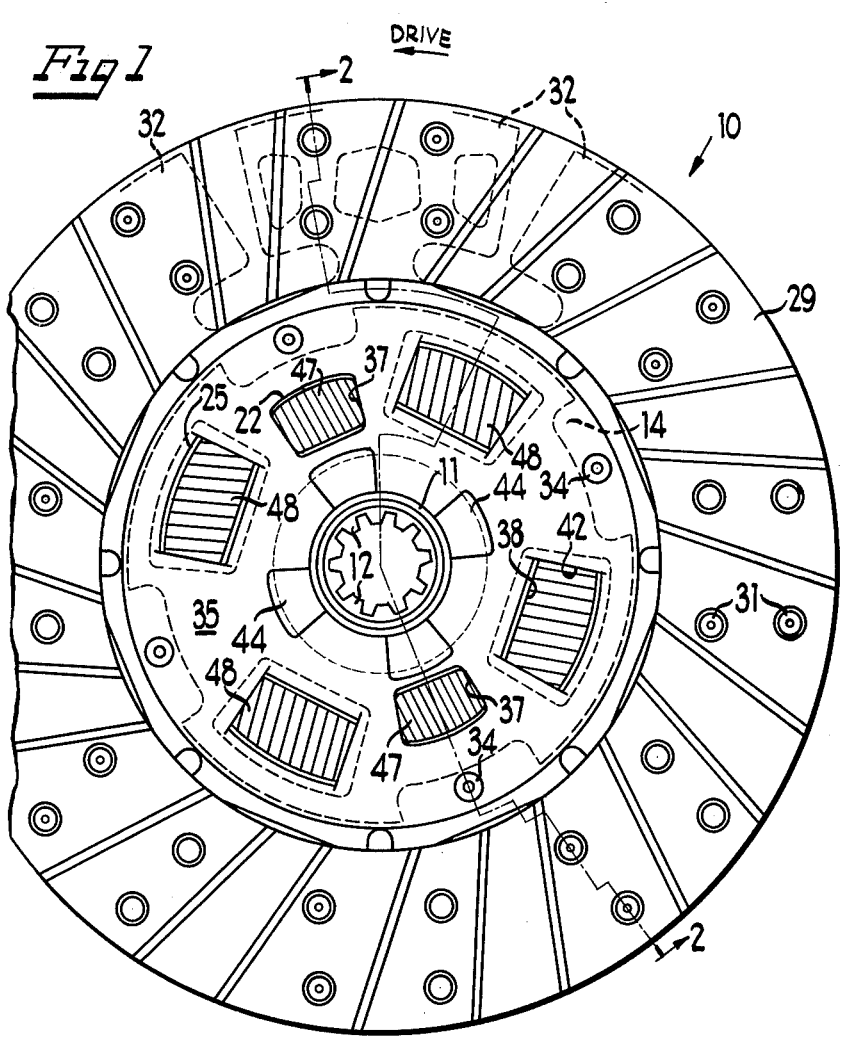
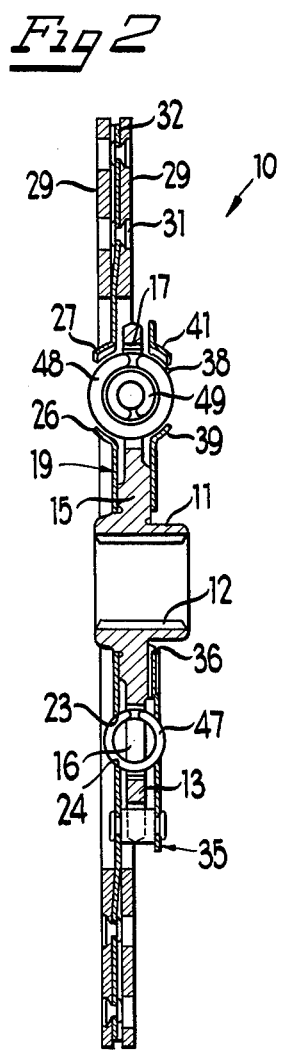
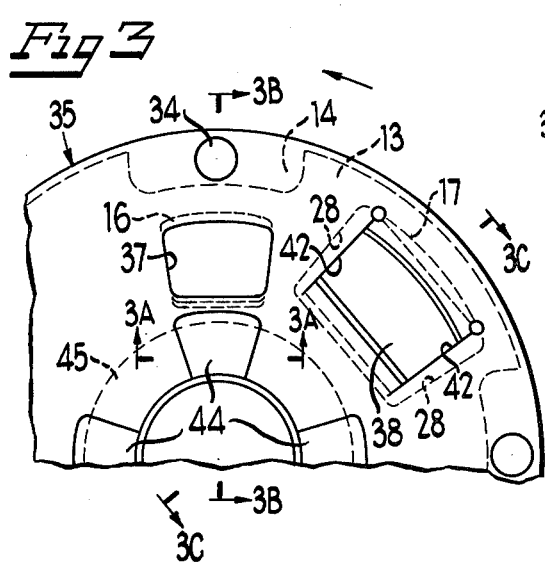
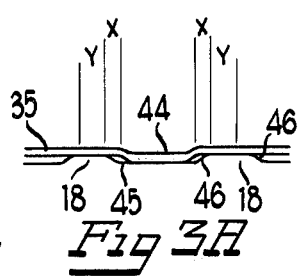
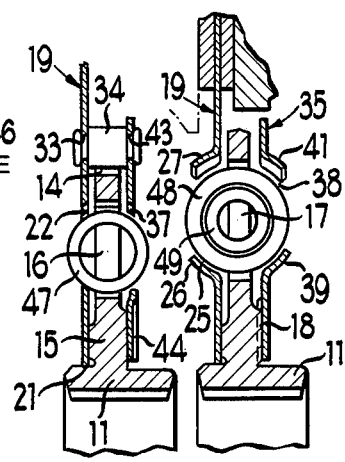

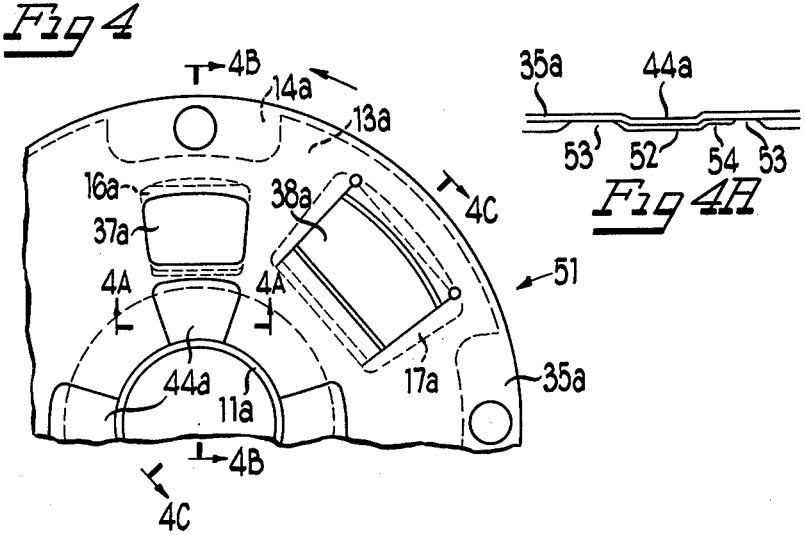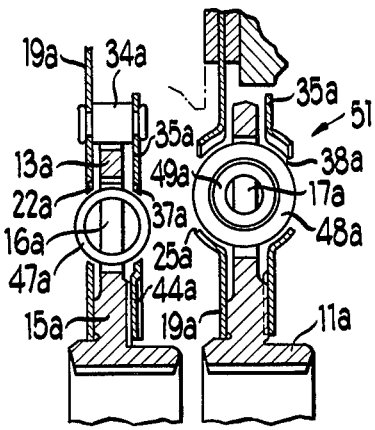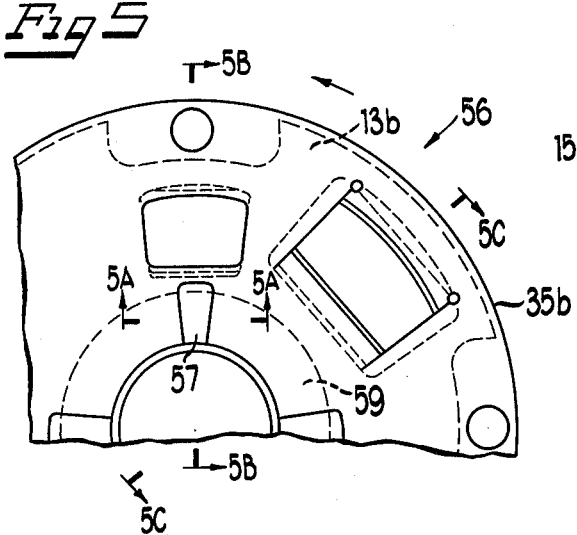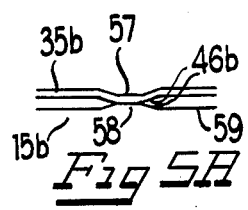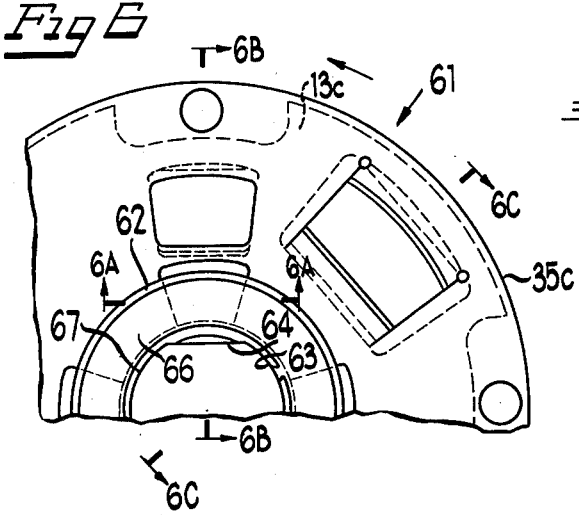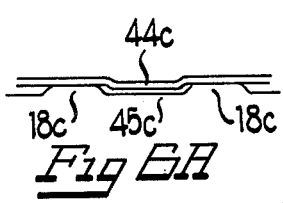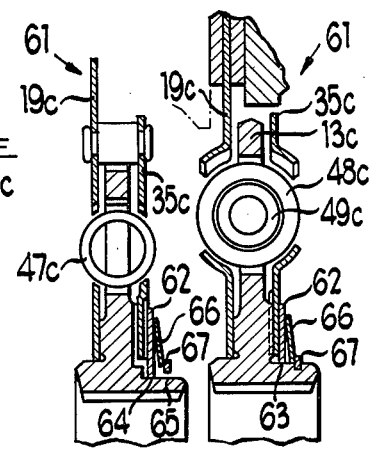

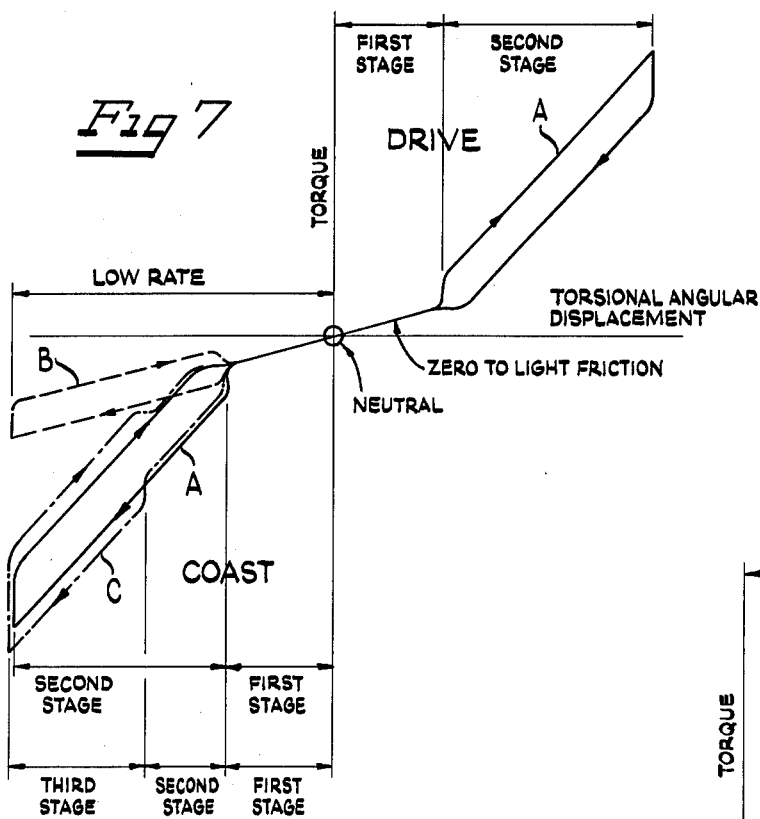
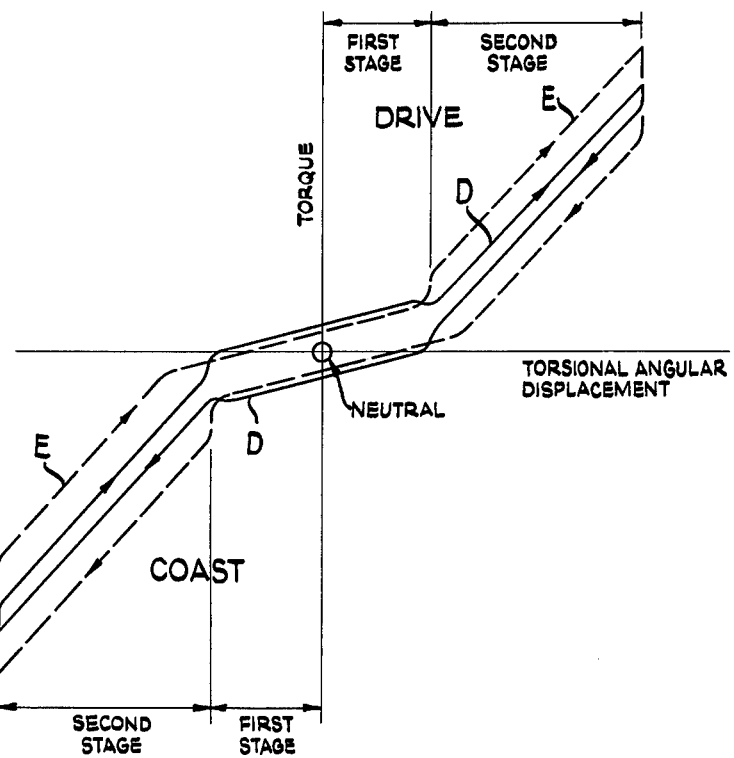
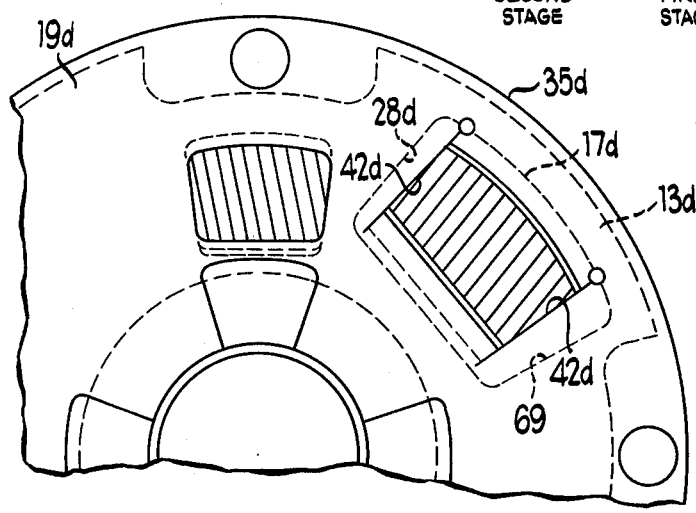

VIBRATION DAMPER WITH VARIABLE SPRING RATE AND DAMPING FRICTION

BACKGROUND OF THE INVENTION

The use of clutches in motor vehicle power trains has been troubled over the years with the problem of torsional vibration of the connected elements of the power train. To neutralize the torsional vibrations emanating from a vehicle engine which would otherwise cause disturbing noises in the transmission and driveline, a vibration damper has been utilized in the friction clutch assembly ahead of a manually operated transmission. A vibration dampener may also be used where a lock-up clutch is inserted in a torque converter for an automatic transmission.

A vibration damper assembly will normally include an output hub internally splined to an output shaft, a radial flange on the hub, a clutch plate and a spring retainer plate sandwiching the hub flange, and a plurality of damper springs received in circumferentially spaced aligned sets of openings in the plates and flange. The clutch plate carries the friction surfaces adjacent its outer periphery and is secured to the retainer plate by a plurality of rivets extending through recesses in the flange. Friction washers may be positioned between the flange and plates adjacent the hub. However, where the damper design provides for a constant rate of energy dissipation, the assembly has many times proved to be unsatisfactory, and the present invention overcomes the problems of prior designs.

SUMMARY OF THE INVENTION

The present invention comprehends the provision of a vibration dampener assembly for use in an automotive vehicle clutch having a variable deflection rate and friction damping, wherein the first stage of travel in the assembly has a low deflection rate and the second stage of travel has an increased deflection rate. Also, a variable damping friction is provided by a cam construction whereby angular displacement of the vibration damper varies the axial force acting on damping friction. The cam surfaces may be varied so that as the angular displacement increases, the degree of damping friction can increase or decrease in predetermined stages. Thus, the damper assembly will be effective for reducing engine and driveline noises over a wide range of vibration frequencies depending on the torsional characteristics of the clutch disc.

The present invention may be summarized as a vibration damper assembly including a hub and integral radial flange, a clutch plate and parallel spring retainer plate sandwiching the flange and joined by rivets, the clutch plate having friction facings adjacent its periphery, a first plurality of torsion springs between the flange and plate to provide a first stage with a low torque per degree of angular deflection, a second plurality of torsion springs providing a second stage with a higher torque per degree of angular deflection, and camming portions on the hub flange and one of the plates acting to provide an initial degree of frictional drag during the first travel stage and then increasing or decreasing the degree of frictional drag torque for the remainder of damper travel.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is an elevational view of a clutch disc embodying the vibration damper assembly of the present invention taken from the right-hand side of FIG. 2.

FIG. 2 is a vertical cross sectional view taken on the irregular line 2—2 of FIG. 1.

FIG. 3 is a partial elevational view of the vibration damper assembly taken from the right-hand side of FIGS. 3B and 3C with the friction facings omitted.

FIG. 3A is a horizontal cross sectional view taken on the line 3A—3A of FIG. 3.

FIG. 3B is a cross sectional view taken on the line 3B—3B of FIG. 3.

FIG. 3C is a cross sectional view taken on the line 3C—3C of FIG. 3.

FIG. 4 is a partial elevational view of a second embodiment of vibration damper assembly taken from the right-hand side of FIGS. 4B and 4C, with FIGS. 4A, 4B and 4C being cross sectional views taken on lines 4A—4A, 4B—4B and 4C—4C, respectively, of FIG. 4.

FIG. 5 is a partial elevational view of a third embodiment of damper assembly taken from the right-hand side of FIGS. 5B and 5C, with FIG. 5A, 5B and 5C being cross sectional views taken on lines 5A—5A, 5B—5B and 5C—5C, respectively, of FIG. 5.

FIG. 6 is a partial elevational view of a fourth embodiment of damper assembly taken from the right-hand side of FIGS. 6B and 6C, with FIGS. 6A, 6B and 6C being cross sectional views taken on lines 6A—6A, 6B—6B and 6C—6C, respectively, of FIG. 6.

FIG. 7 is a graphic representation of the relationship between torque and angular displacement for several damper assemblies.

FIG. 8 is a graphic representation similar to FIG. 6, but for damper assemblies having an initial positive friction damping.

FIG. 9 is a partial elevational view similar to FIG. 3 of a fifth embodiment of damper assembly.

DESCRIPTION OF THE PREFERRED EMBODIMENTS

Referring more particularly to the disclosure in the drawings wherein are shown illustrative embodiments of the present invention, FIG. 1 discloses a clutch disc assembly 10, including a vibration damper, adapted to be mounted on the end of a driven shaft and positioned between a flywheel and a pressure plate (not shown) rotated by the vehicle engine. The clutch disc assembly includes a hub 11 internally splined at 12 to be operatively connected to the driven shaft (not shown) and having an integral radially extending flange 13. The flange is provided with a plurality of circumferentially equally spaced elongated recesses 14 on the periphery thereof with a base 15 of the flange that is slightly thicker than the remaining portion.

The flange has a pair of oppositely disposed windows or openings 16, 16 therein and four circumferentially spaced larger windows or openings 17; the openings 17 being positioned intermediate the recesses 14. The base 15 of the flange is provided with a plurality of circumferentially spaced raised cam areas including cam surfaces 18 extending outward from the hub to terminate at a circle having a radius slightly less than the radius of the inner edge of the openings 16.

A clutch or driven plate 19 is located at one side of the flange 13 and has a central opening 21 to receive the hub 11, a pair of openings 22 generally aligned with the openings 16 in the flange, and four larger openings 25 generally aligned with the openings 17 in the flange. The openings 22 have inner and outer edges 23, 24 spaced apart a distance less than the width of the openings 16 so as to retain torsion springs therein, and the openings 25 have inner and outer curved lips 26, 27 acting as spring retainers. The end edges 28, 28 of the openings 17 have a greater arcuate spacing than the spacing between the end edges of the openings 25 to provide a lost motion arrangement to be later described.

Beyond the periphery of the flange 13, the clutch plate is provided with opposite friction facings 29, 29 secured by rivets 31 onto circumferentially spaced paddles or pads 32 formed integral on the periphery of the disc. The disc is also provided with openings 33 for rivets 34 which are centrally positioned within and extend through the recesses 14 in the flange.

On the opposite side of the flange is positioned a spring retainer plate 35 having a central opening 36 receiving the hub, a pair of openings 37 identical to the openings 22, and four openings 38 identical to the openings 25. The openings 38 have curved inner and outer lips 39 and 41, respectively, and end edges 42 are spaced apart the same distance as the edges of openings 25. Openings 43 are provided adjacent the outer periphery of the plate to receive the rivets 34. At the inner periphery of the plate 35, a plurality of circumferentially spaced cam areas or depressions 44 are formed in the plate to cooperate with the raised cam surfaces 18 on the flange base 15. As seen in FIG. 3A, the width of a depression 44 in the plate 35 is less than the width of the area 45 between the raised cam portions 18; both the depressions 44 and the cam surfaces 18 being defined by inclined camming edges 46.

Therefore, when considering the relative angular displacement between the plate 35 and the hub flange 13, a distance "X" of rotation in either the drive direction or the coast direction provides zero or very light friction travel until the depressions 44 engage the cam surfaces 18. Once the angular travel exceeds the distance "X" and the depressions 44 ride up on the cam surfaces 18 to create an interference condition, there is a distance "Y" of high friction travel.

A first pair of torsion springs 47 are positioned in the windows 16 of the flange 13 and the aligned openings 22 and 37 of the plates, and outer torsion springs 48 and inner torsion springs 49 are positioned in the aligned openings 25 and 38. The rivets 34 are centrally positioned in the recesses 14 and are secured in the openings 33 and 43 in the plates 19 and 35 to cause the plates to act in unison. The elongated recesses 14 provide motion limiting means for the relative rotation between the plates and the hub flange.

The clutch disc assembly 10 is mounted on a shaft for the vehicle transmission and is positioned between the flywheel and the pressure plate of the vehicle clutch (not shown). As the clutch is engaged, the pressure plate engages the friction facings 29 and urges the clutch disc against the flywheel, resulting in rotation of the joined plates 19 and 35 to initially compress the springs 47 for the predetermined first stage of travel between the plates and the hub 11 and flange 13. The windows 17 in the flange 13 are longer in arcuate dimension than the aligned windows 25 and 38 in the plates so that the torsion springs 48 and 49 engage the window edges 42, 42 but do not initially contact the edges 28 of the windows 17. Thus, during the first stage of travel, the difference in arcuate distance between the edges 28 and the edges 42, 42 allows the plates to move relative to the hub flange without compression of the springs 48 and 49. This first stage travel also encompasses the distance "X" prior to engagement of the inclined camming surfaces 46 for low frictional drag.

Following the first stage of travel at the low deflection rate of the torsion springs 47, the springs 48, 49 will contact the edges 28 of the hub flange windows 17 to indicate the second stage of travel under a higher deflection rate. Substantially simultaneously with the engagement of the springs 48, 49, the recessed portions 44 in the plate 35 ride up on the raised cam surfaces 18 on the flange base 15 to create an interference condition resulting in a requisite frictional drag during the second stage of damper travel to rotate the hub 11 and the driven shaft. Disengagement of the clutch pressure plate from the friction facings 29 will reverse the above damping function.

FIGS. 4, 4A, 4B and 4C disclose a second embodiment of damper assembly 51 wherein elements identical to those of the first embodiment will have the same reference numeral with the addition of a script *a*. This structure is substantially identical to the first embodiment with the exception of the camming arrangement for the friction damping. Thus, the hub 11a has a radial flange 13a with a base 15a, recesses 14a, a pair of windows 16a for torsion springs 47a, and windows 17a for torsion springs 48a, 49a. The driven plate 19a has windows 22a for the springs 47a, windows 25a for springs 48a, 49a, and is joined to the retainer plate 35a by rivets 34a extending through the recesses 14a of the flange 13a. Also, the plate 35a has windows 37a for springs 47a and windows 38a for springs 48a, 49a.

The plate 35a is provided with a plurality of circumferentially spaced cam depressions 44a on the inner periphery thereof cooperating with camming surfaces on the flange base 15a. The camming surfaces include a plurality of circumferentially spaced depressed areas 52, a plurality of raised cam surfaces 53 on both the drive and coast sides of each depression 52, and an intermediate raised cam surface 54 of a lesser height than the surface 53 on the coast side only of each depression (FIG. 4A).

In operation if the clutch is engaged during acceleration or driving, the plate 19a, 35a move relative to the hub flange 13a to compress the springs 47a and provide a low deflection rate, while the depressions 44a move in the depressed areas 52 for a zero or low friction damping rate. When the springs 48a, 49a engage the flange 13a and are compressed to provide a high deflection rate, the cam depressions 44a ride up on the raised surfaces 53 to provide a high damping friction. When the operator removes his foot from the accelerator pedal, the vehicle will coast subject only to the drag of the engine. The coasting reverses the relative movement of the plates and hub flange such that the depression 44a rides up on the intermediate cam surface 54 to provide an intermediate damping friction during coasting and may move farther to ride up on the cam surface 53 on the coast side.

FIGS. 5, 5A, 5B and 5C disclose a third embodiment of clutch plate with a vibration damper 56 which provides for a high initial friction damping followed by a lower friction damping; wherein like parts will have the same reference numeral with the addition of a script *b*.

Here again, the only difference in this embodiment is the camming arrangement. The retainer plate 35b is provided with four circumferentially equally spaced cam depressions 57 which are considerably narrower than those of the first two embodiments. Likewise, the hub flange base 15b has a corresponding number of raised cam surfaces 58 separated by relatively wide depressions 59. The cam surfaces 58 and the depressions 57 are of a width substantially equal to twice the degree of travel of the plates 19b, 35b relative to the hub flange 13b at the low deflection rate. Also, the camming edges 46b are of a gentle slope so that upon absence of torque, the low rate of deflection will restore the damper assembly to its neutral condition.

As seen in FIG. 5A, the depressions 57 are in engagement with and substantially coincide with the raised cam surface in the initial clutch disengaged position to provide an interference condition. Therefore, upon initial engagement of the clutch, the plates are in an interference arrangement providing a high friction engagement with a low deflection rate over the first travel increment. As the torsion springs 48b; 49b engage the hub flange 13b to initiate the high deflection rate, the depressions 57 move off of the raised cam surfaces 58 into the depressions 59 to provide zero or low friction for the second travel stage. The same pattern will be true for the coast stage of the vehicle.

FIGS. 6, 6A, 6B and 6C disclose a fourth embodiment of damper assembly 61 wherein like parts have the same reference numeral with a script c. The assembly includes the hub flange 13c, clutch plate 19c, spring retainer plate 35c, and first and second sets of torsion springs 47c and 48c, 49c. The flange base 15c has a plurality of circumferentially spaced raised cam surfaces 18c separated by areas 45c, and the plate 35c has a corresponding number of depressions 44c initially positioned in the areas 45c. To enhance the frictional damping, a friction plate 62 of a generally circular shape is provided with a central opening 63 having a flat surface 64 formed therein. Likewise the hub 11c has a flattened surface 65 corresponding to the surface 64 so that when the friction plate 62 is positioned on the hub 11c, the flattened surfaces 64, 65 prevent relative rotation therebetween. A diaphragm or Belleville spring 66 is positioned on the hub 11c with its outer periphery engaging the friction plate 62 and the inner periphery engaging a snap ring 67 received in a groove in the hub 11c. The spring 66 provides a biasing force against the plate 62, and this arrangement operates in the same manner as the first embodiment except the initial friction force is higher for both the drive and coast stages of operation.

FIG. 7 discloses a graphic representation to show the relationship of torque versus torsional angular displacement of the vibration damper assembly of the present invention. The solid line A discloses a curve for the first embodiment of damper assembly (FIG. 3). Obviously this curve can be altered by changing the friction characteristics, the sizes of the torsion springs or the dimensions of the spring openings. The dotted line curve B for the coast side of the graph shows the change occuring by altering the window relationships for the springs as shown in FIG. 9. In this figure, the windows 17d in the hub flange 13d are changed to provide a larger lost motion distance on the coast side by moving the end edge 69 farther away from the edge 42d of the plates 19d, 35d than the end edge 28d. Thus, in the drive direction, the damper characteristics will follow the solid line of the graph for a first stage of low deflection rate, low friction with a second stage of high deflection rate and high friction. However, in view of the edge 69, the coast direction provides a first stage of low deflection rate, low friction and a second stage having the same low deflection rate with high friction as shown in dotted lines B of FIG. 7. The curve for the second damper embodiment of FIG. 4 follows the solid line curve in the drive direction and the dot-dash curve C in the coast direction. FIG. 8 shows the curves for the third and fourth embodiments of damper assemblies of FIGS. 5 and 6. The solid line curve D for the third embodiment shows an initial torque provided by the high friction at initiation of the first stage and a narrower loop for the second stage where friction is zero or low but the deflection rate is high. The dotted line curve E for the fourth embodiment will be similar to the curve A of FIG. 7 for the first embodiment except there is an initial torque in either direction due to the increased friction from the friction plate.

While damper assemblies of particular and effective shapes to provide the curves of the graphs have been shown and described by way of illustration, it is obvious that the curves can be easily changed by varying the spring size, the friction engagement and the window sizes and these examples are not to be interpreted as limiting or restricting the scope or the invention described herein.

I claim:

1. A vibration damper assembly for a vehicle friction clutch comprising a hub operatively connected to a driven shaft, a radial flange integral with said hub, a clutch plate rotatably mounted on said hub and terminating at its outer periphery in oppositely disposed friction facings secured thereto, a spring retainer plate rotatably mounted on said hub and secured to said clutch plate for rotation therewith, said clutch plate and said spring retainer plate sandwiching said hub flange, a plurality of circumferentially spaced first aligned openings in said plates and flange, a torsion spring for each set of said first openings providing a first stage of angular displacement, a plurality of circumferentially spaced second aligned openings in said plates and flange, at least one torsion spring for each set of said second openings, the second openings in said hub flange having a greater arcuate dimension than the second openings in the plates thereby providing a second stage of angular displacement, means to limit the extent of arcuate movement of said plates relative to said hub and flange, a plurality of circumferentially spaced raised cam areas on said flange adjacent said hub separated by depressed areas, and a plurality of depressed cam areas on said spring retainer plate adjacent the inner periphery thereof cooperating with the cam areas on the flange, wherein said plates move relative to said flange over said first stage at a low rate of angular displacement and over said second stage at a higher rate of angular displacement, and said cam areas providing a low friction rate and a high friction rate over said displacement stages, said friction rate shifting from one level to the other simultaneously with the change between stages of angular displacement.

2. A vibration damper assembly as set forth in claim 1, wherein said depressed cam areas are received in the depressed areas between said raised cam areas on said flange, said depressed areas having a greater arcuate dimension than said depressed cam areas to provide a lost motion area at substantially zero friction over the first stage of displacement, said depressed cam areas engaging said raised cam areas at the initiation cam areas engaging said raised cam areas at the initiation of the second stage of displacement.

3. A vibration damper assembly as set forth in claim 2, in which each raised cam area in the coast direction for the damper is provided with an intermediate height cam surface and a full raised cam surface in successive steps.

4. A vibration damper assembly as set forth in claim 2, including a friction plate nonrotatably mounted on said hub and adapted to frictionally engage the outer surface of said spring retainer plate, and biasing means urging said friction plate against said spring retainer plate.

5. A vibration damper assembly as set forth in claim 4, in which said biasing means comprises a diaphragm spring retained on the hub by a snap ring.

6. A vibration damper assembly as set forth in claim 5, in which said friction plate provides an initial friction damping during the first stage of displacement and a higher friction damping during the second stage of displacement.

7. A vibration damper assembly as set forth in claim 1, wherein the second openings in said flange provide lost motion travel without engagement of said contained torsion springs during said first stage of displacement.

8. A vibration damper assembly as set forth in claim 7, in which each second opening in said flange has an edge spaced farther in the coast direction from the second openings in said plates than the opposite edge in the drive direction.

9. A vibration damper assembly as set forth in claim 1, in which said springs include an inner torsion spring and an outer torsion spring for each set of second openings.

10. A vibration damper assembly as set forth in claim 1, in which said depressed cam areas are positioned opposite and normally engage said raised cam areas with said clutch disengaged, said depressed and raised cam areas providing an initial high friction for the first stage of displacement which drops to a low friction during the second stage of displacement.

11. A vibration damper assembly as set forth in claim 10, in which said depressed cam areas move off of the raised cam areas into the depressed areas on the flange at the end of the first stage of displacement.

* * * * *